(12) United States Patent
Cho et al.

(10) Patent No.: US 9,330,385 B2
(45) Date of Patent: May 3, 2016

(54) CARD PAYMENT SYSTEM

(71) Applicant: KT Corporation, Seongnam-si, Gyeonggi-do (KR)

(72) Inventors: Youngbin Cho, Seoul (KR); Sung-Chul Kim, Goyang-si (KR); Youn-pil Jeung, Seongnam-si (KR)

(73) Assignee: KT Corporation, Seongnam-si (KR)

( * ) Notice: Subject to any disclaimer, the term of this patent is extended or adjusted under 35 U.S.C. 154(b) by 0 days.

(21) Appl. No.: 14/013,107

(22) Filed: Aug. 29, 2013

(65) Prior Publication Data

US 2014/0061300 A1 Mar. 6, 2014

(30) Foreign Application Priority Data

Aug. 29, 2012 (KR) ........................ 10-2012-0095219

(51) Int. Cl.
| | |
|---|---|
| *G06K 7/00* | (2006.01) |
| *G06Q 20/34* | (2012.01) |
| *G06Q 20/32* | (2012.01) |
| *G07F 7/08* | (2006.01) |
| *H04M 1/21* | (2006.01) |

(52) U.S. Cl.
CPC ........ *G06Q 20/3567* (2013.01); *G06Q 20/3226* (2013.01); *G06Q 20/3229* (2013.01); *G06Q 20/3272* (2013.01); *G06Q 20/347* (2013.01); *G06Q 20/353* (2013.01); *G07F 7/0873* (2013.01); *H04M 1/21* (2013.01)

(58) Field of Classification Search
USPC ...................... 235/435, 439, 449, 375, 379.38
See application file for complete search history.

(56) References Cited

U.S. PATENT DOCUMENTS

| | | | |
|---|---|---|---|
| 2002/0030871 A1* | 3/2002 | Anderson et al. ............. 359/150 |
| 2010/0108762 A1* | 5/2010 | Morley, Jr. ..................... 235/449 |
| 2012/0095867 A1* | 4/2012 | McKelvey ........... G06Q 20/322 705/26.41 |

FOREIGN PATENT DOCUMENTS

KR 10-0481439 B1 4/2005

OTHER PUBLICATIONS

Luis Padilla Visodomine, "Turning your mobile into a magnetic stripe reader".*
Luis Padilla Visodomine "Magnetic stripe reader circuit".*

* cited by examiner

*Primary Examiner* — Matthew Mikels
(74) *Attorney, Agent, or Firm* — Brundidge & Stanger, P.C.

(57) ABSTRACT

In one example embodiment, a card payment system includes a card payment apparatus, having an audio jack, configured to: read account information stored on a payment card, transmit the account information via a microphone contact of an audio jack, and receive an acoustic signal via at least one earphone contact of the audio jack; and a client device, having an audio jack socket to receive the audio jack, configured to: receive, from the card payment apparatus, the account information via a receptor for the microphone contact of the audio jack, and transmit, to the card payment apparatus, the acoustic signal via the at least one earphone contact.

16 Claims, 9 Drawing Sheets

CARD PAYMENT SYSTEM

TECHNICAL FIELD

The embodiments described herein pertain generally to a card payment system.

BACKGROUND

Making electronic payments for goods and services has become increasingly convenient in many contexts. Companies and individuals routinely use credit cards to buy goods online and to remit payments to service providers.

SUMMARY

In one example embodiment, a card payment system includes a card payment apparatus, having an audio jack, configured to read account information stored on a payment card, transmit the account information via a microphone contact of an audio jack, and receive an acoustic signal via at least one earphone contact of the audio jack; a client device, having an audio jack socket to receive the audio jack, configured to: receive, from the card payment apparatus, the account information via a receptor for the microphone contact of the audio jack, and transmit, to the card payment apparatus, the acoustic signal via the at least one earphone contact.

In another example embodiment, an apparatus includes an audio jack having at least one earphone contact and a microphone contact; a card reader configured to read a first digital signal stored on a card; and a signal processor configured to: convert the first digital signal to a first analog signal, transmit, to a client device, the first analog signal via the microphone contact, receive, via the at least one earphone contact, a second analog signal, and convert the received second analog signal to a second digital signal, wherein the first digital signal includes account information and the second digital signal includes a request to read the account information.

In yet another example embodiment, a client device includes an audio jack socket configured to receive an audio jack that includes at least one earphone contact and a microphone contact; a transceiver configured to: receive, from the microphone contact, a first analog signal to which a first digital signal is converted, and transmit, to the least one earphone contact, an acoustic signal and a second analog signal to which a second digital signal is converted; and a signal generator configured to: generate the acoustic signal, and convert the second digital signal to the second analog signal, wherein the first digital signal includes account information stored on a payment card and the second digital signal includes a request to read the account information.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

Figure 1:
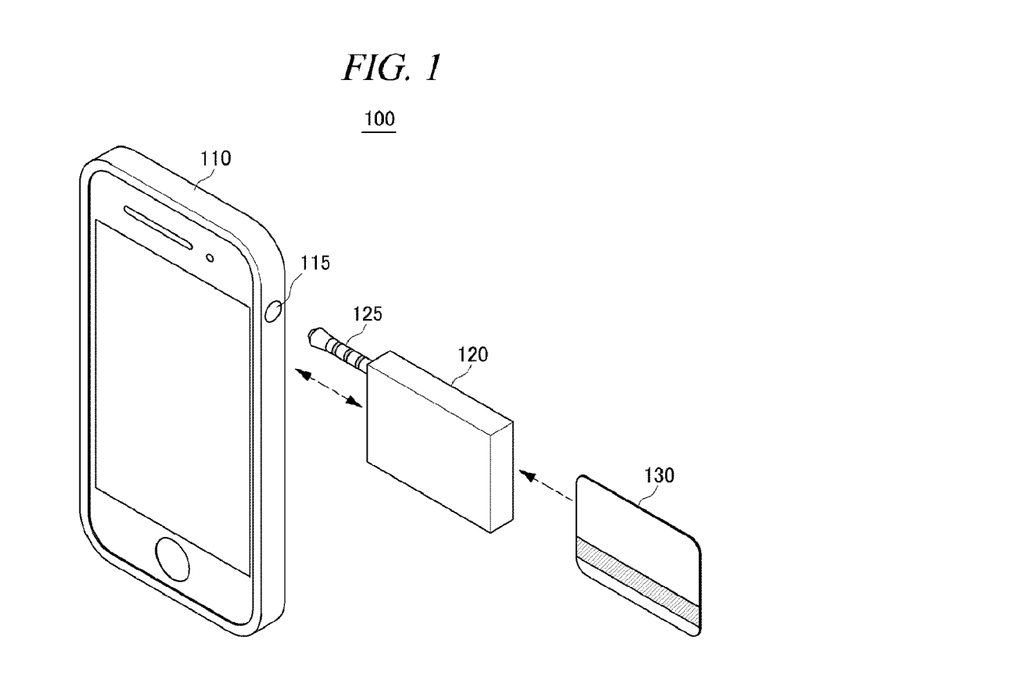
FIG. 1 shows an example system configuration in which one or more embodiments of a card payment system may be implemented.

FIG. 1 shows an example system configuration 100 in which one or more embodiments of a card payment system may be implemented. As depicted in FIG. 1, system configuration 100 includes, at least, a client device 110, and a card payment apparatus 120. Client device 110 may refer to at least one of a device that has an audio jack socket 115, such as a mobile phone, a portable device, a notebook, or even a personal computer or a personal communication terminal, such as PCS (Personal Communication System), GMS (Global System for Mobile communications), PDC (Personal Digital Cellular), PDA (Personal Digital Assistant), IMT (International Mobile Telecommunication)-2000. Client device 110 and card payment apparatus 120 may be connected when audio jack socket 115 corresponding to client device 110 receives an audio jack 125 corresponding to card payment apparatus 120.

Client device 110 may be configured to receive, from card payment apparatus 120 via audio jack 125, a first analog signal to which a first digital signal is converted. The first digital signal may include account information which may be read from a card 130 by card payment apparatus 120. By way of example, but not limitation, the account information may include at least one of an account number, a card expiration date, etc. Card payment apparatus 120 may be configured to convert the read account information into the first analog signal by using any well-known digital-analog converting scheme and to transmit the converted first analog signal to client device 110 via audio jack 125.

Client device 110 may be further configured to generate an acoustic signal. By way of example, client device 110 may generate the acoustic signal based on at least one of a waveform, a frequency, a duration, an amplitude, or a phase of an analog signal. The generated acoustic signal may be transmitted to card payment apparatus 120 via audio jack 125. Further, client device 110 may be configured to generate a second digital signal that includes a request for card payment apparatus 120 to read the account information from card 130. By way of example, client device 110 may generate the second digital signal based on at least one of a frequency, a bit rate, or a bit interval of at least one of a pulse signal or a rectangular signal. Client device 110 may be further configured to convert the generated second digital signal into a second analog signal by using any well-known digital-analog converting scheme and to transmit the converted second analog signal to card payment apparatus 120 via audio jack 125.

Further, client device 110 may be configured to convert the received first analog signal into the first digital signal, which includes the account information, by using any well-known analog-digital converting scheme. Then, client device 110 may be configured to execute a card payment based at least in part on the account information through a card payment server (not illustrated in FIG. 1) which is communicatively coupled to client device 110 via a wireless network. The card payment server may refer to an organization or entity that provides some type of communication service, data storage service, data or information processing service, content service, or any combination thereof to business customers or consumers. The card payment server may host one or more servers or other processing apparatuses that may be configured to receive the one or more card payment execution requests from client device 110, and to provide client device 110 with the one or more expressions of at least one result of the card payment execution in response to the received card payment execution requests. Non-limiting example of the card payment server may include a financial service provider, a banking service provider, or a credit card service provider.

Client device 110 may be further configured to receive the one or more expressions of at least one result of the card payment execution from the card payment server and to display the received expressions of the card payment execution on a display or a screen that is operatively coupled thereto.

Card payment apparatus 120 may be configured to receive the acoustic signal from client device 110 via audio jack 125. Card payment apparatus 120 may be further configured to convert electrical components of the received acoustic signal into electric power by using at least one electric circuit installed in card payment apparatus 120 so that card payment apparatus 120 may operate card payment apparatus 120.

Further, card payment apparatus 120 may be configured to receive the second analog signal from client device 110 via audio jack 125. Then, card payment apparatus 120 may be configured to convert the received second analog signal into the second digital signal that includes the request to read the account information from card 130 by using any well-known analog-digital converting scheme.

Card payment apparatus 120 may be further configured to read the account information from card 130. In some embodiments, card payment apparatus 120 may read the account information in response to receipt of the second digital signal that includes the card read request. By way of example, but not limitation, card payment apparatus 120 may have at least one of a magnetic strip reader that is configured to read information from a magnetic strip of card 130 or an integrated circuit chip reader that is configured to read information from an integrated circuit chip of card 130.

Further, card payment apparatus 120 may be configured to convert the first digital signal, which includes the read account information, into the first analog signal by using any well-known digital-analog converting scheme and to transmit the converted first analog signal to client device 110 via audio jack 125.

Thus, FIG. 1 shows an example system configuration 100 in which one or more embodiments of a card payment system may be implemented.

Figure 2:
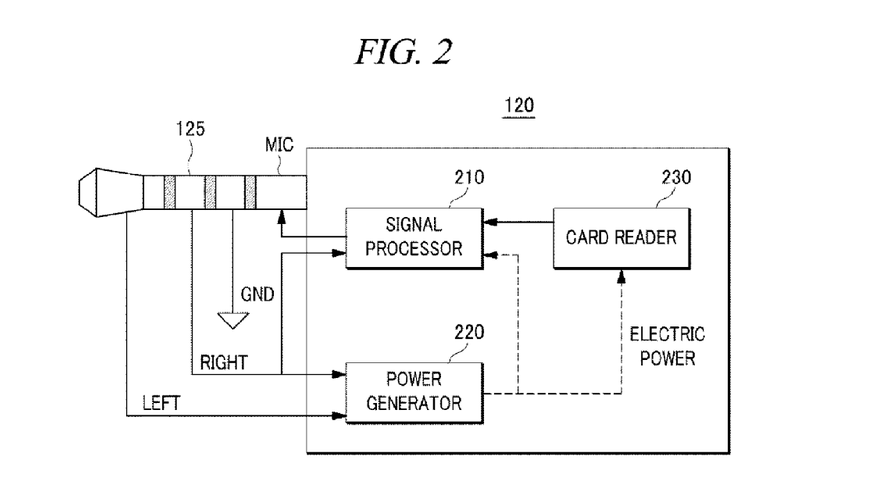
FIG. 2 shows an example configuration of a card payment apparatus by which at least portions of a card payment system may be implemented.

FIG. 2 shows an example configuration of a card payment apparatus 120 by which at least portions of a card payment system may be implemented. As depicted in FIG. 2, card payment apparatus 120, which is described above with regard to FIG. 1, may include audio jack 125, a signal processor 210, a power generator 220, and a card reader 230. Although illustrated as discrete components, various components may be divided into additional components, combined into fewer components, or eliminated altogether while being contemplated within the scope of the disclosed subject matter. Each function and/or operation of the components may be implemented, individually and/or collectively, by a wide range of hardware, software, firmware, or any combination thereof. In that regard, one or more of signal processor 210, power generator 220, and card reader 230 may be included in an instance of an application hosted by card payment apparatus 120.

In some embodiments, audio jack 125 may include at least one earphone contact, a ground contact and a microphone contact. Audio jack 125 may be inserted into audio jack socket 115 that is installed on a surface of client device 110. At least one analog signal associated with information or data may be transmitted from client device 110 to card payment apparatus 120 via the at least one earphone contact and, conversely, at least one analog signal may be transmitted from card payment apparatus 120 to client device 110 via the microphone contact.

By way of example, but not limitation, as depicted in FIG. 2, audio jack 125 may include two earphone contacts, one of which is connected to a left side earphone (i.e., left earphone contact) and the other one is connected to a right side earphone (i.e., right earphone contact).

In some embodiments, signal processor 210 may be configured to convert a first digital signal that includes account information, which is read by card reader 230, into a first analog signal by using any well-known digital-analog converting scheme. Then, signal processor 210 may be configured to transmit the first analog signal to client device 110 via the microphone contact of audio jack 125.

In some embodiments, signal processor 210 may be configured to receive, from client device 110, an acoustic signal that includes a second analog signal via one of the two earphone contacts of audio jack 125 (e.g., right earphone contact). The second analog signal is a signal to which a second digital signal that includes a card read request is converted.

Signal processor 210 may be further configured to extract the second analog signal from the received acoustic signal and to convert the second analog signal into the second digital signal by using any well-known analog-digital converting scheme. By way of example, but not limitation, the acoustic signal may include a periodic signal portion and a non-periodic signal portion that is associated with the second digital signal. Signal processor 210 may extract the non-periodic signal portion of the acoustic signal and then, convert the non-periodic signal portion of the acoustic signal into the digital card read request.

In some embodiments, client device 110 may transmit, to card payment apparatus 120, the second analog signal separately with an acoustic signal that is used to generate electric power. Signal processor 210 may be configured to receive, from client device 110, the second analog signal via one of the two earphone contacts of audio jack 125 (e.g., right earphone contact) and to convert the received second analog signal into the second digital signal by using any well-known analog-digital converting scheme.

In some embodiments, power generator 220 may be configured to receive, from client device 110, the acoustic signal that includes the second analog signal, via at least one of the two earphone contacts of audio jack 125. Alternatively, power generator 220 may be configured to receive, from client device 110, the acoustic signal, which is not associated with digital data or information, via the other one of the two earphone contacts of audio jack 125 (e.g., left earphone contact).

Power generator 220 may be further configured to convert electrical components of the received acoustic signal into electric power to operate card payment apparatus 120. Then, power generator 220 may be configured to provide at least one of signal processor 210 or card reader 230 with the generated electric power.

Card reader 230 may be configured to read a first digital signal that includes account information of card 130. By way of example, but not limitation, the account information may include at least one of an account number, a card expiration date, etc. In some embodiments, card reader 230 may read the account information from a magnetic strip of card 130 or an integrated circuit chip of card 130. Card reader 230 may be further configured to transmit the first digital signal which includes the account information to signal processor 210.

Thus, FIG. 2 shows an example configuration of card payment apparatus 120 by which at least portions of a card payment system may be implemented.

Figure 3:
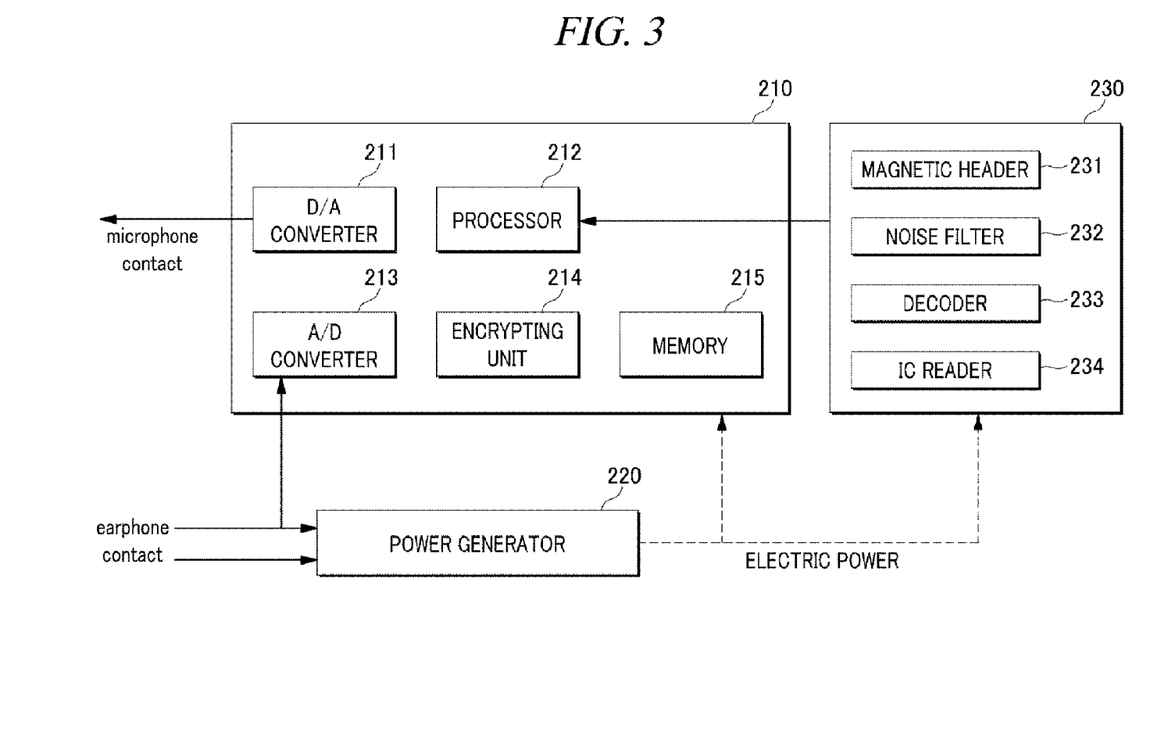
FIG. 3 shows a specific example configuration of a card payment apparatus by which at least portions of a card payment system may be implemented.

FIG. 3 shows a specific example configuration of a card payment apparatus by which at least portions of a card payment system may be implemented. As depicted in FIG. 3, signal processor 210, which is described above with regard to FIG. 2, may include a digital-analog converter 211, a processor 212, an analog-digital converter 213, an encrypting unit 214, and a memory 215. Card reader 230, which is described above with regard to FIG. 2, may include a magnetic header 231, a noise filter 232, a decoder 233, and an IC reader 234. Although illustrated as discrete components, various components may be divided into additional components, combined into fewer components, or eliminated altogether while being contemplated within the scope of the disclosed subject matter. Each function and/or operation of the components may be implemented, individually and/or collectively, by a wide range of hardware, software, firmware, or any combination thereof. In that regard, one or more of digital-analog converter 211, processor 212, analog-digital converter 213, encrypting unit 214, and memory 215 may be included in an instance of an application hosted by signal processor 210. Further, one or more of magnetic header 231, noise filter 232, decoder 233, and IC reader 234 may be included in an instance of an application hosted by card reader 230.

Digital-analog converter 211 may be configured to convert a first digital signal into a first analog signal. The first digital signal may include account information, which is read by card reader 230, and may be encrypted by encrypting unit 214 by using any well-known encrypting scheme such as a Rivest Shamir Adleman scheme. Digital-analog converter 211 may be configured to convert the encrypted first digital signal into the first analog signal and to transmit the first analog signal to client device 110 via a microphone contact of audio jack 125.

Processor 212 may be configured to receive the first digital signal, which includes the account information from card reader 230, and to transmit the first digital signal to encrypting unit 214. Processor 212 may be further configured to control operations of digital-analog converter 211, analog-digital converter 213, and encrypting unit 214.

Analog-digital converter 213 may be configured to receive, from client device 110, a second analog signal via at least one earphone contacts of audio jack 125. The second analog signal is a signal to which a second digital signal that includes a card read request is converted. The second digital signal may be encrypted by client device 110. Analog-digital converter 213 may be further configured to convert the second analog signal into the second digital signal by using any well-known analog-digital converting scheme and to transmit the second digital signal to encrypting unit 214.

Encrypting unit 214 may be configured to encrypt the first digital signal by using any well-known encrypting-decrypting scheme such as a Rivest Shamir Adleman scheme and to provide the encrypted first digital signal to digital-analog converter 211. Further, encrypting unit 214 may be configured to decrypt the encrypted second digital signal by using any well-known encrypting-decrypting scheme such as a Rivest Shamir Adleman scheme and to provide the second digital signal to processor 212.

Memory 215 may be configured to store at least one of the account information, algorithms for encrypting-decrypting scheme, or predetermined instructions for operations of signal processor 210.

Power generator 220 may be configured to receive, from client device 110, an acoustic signal via at least one earphone contact of audio jack 125. Further, power generator 220 may be configured to convert electrical components of the received acoustic signal into electric power so that card payment apparatus 120 may operate card payment apparatus 120. Power generator 220 may be configured to provide signal processor 210 and card reader 230 with the electric power.

Magnetic header 231 may be configured to generate at least one periodic analog signal or non-periodic signal that has at least one waveform, at least one duration time, or at least one frequency, if card 130 that includes a magnetic strip contacts with magnetic header 231 or approaches magnetic header 231.

Noise filter 232 may be configured to receive the analog signal from magnetic header 231 and to eliminate noise from the analog signal.

Decoder 233 may be configured to convert the analog signal, from which the noise is eliminated, into the first digital signal based on the at least one waveform, duration time or frequency of the analog signal. The first digital signal includes the account information.

IC reader 234 may be configured to read the account information from an integrated circuit chip of card 130 and to transmit a first digital signal that includes the account information to signal processor 210.

Thus, FIG. 3 shows a specific example configuration of a card payment apparatus by which at least portions of a card payment system may be implemented.

Figure 4A:
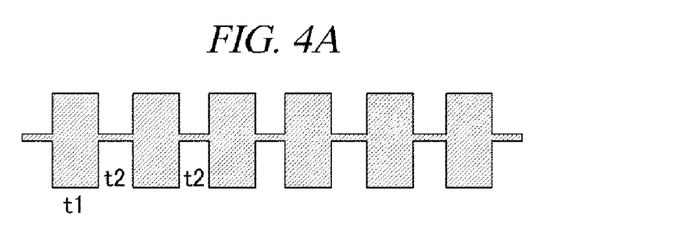
FIG. 4A shows an illustrative example of a signal generated and transmitted by a client device by which at least portions of a card payment system may be implemented.
Figure 4B:
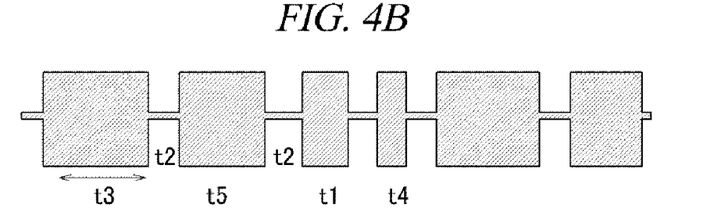
FIG. 4B shows another illustrative example of a signal generated and transmitted by a client device by which at least portions of a card payment system may be implemented.

FIG. 4A shows an illustrative example of a signal generated and transmitted by a client device 110 by which at least portions of a card payment system may be implemented and FIG. 4B shows another illustrative example of a signal generated and transmitted by a client device 110 by which at least portions of a card payment system may be implemented. As depicted in FIG. 4A, client device 110 may be configured to generate an acoustic signal that has a frequency and a regular magnitude. Client device 110 may transmit the periodic acoustic signal of FIG. 4A to card payment apparatus 120 and card payment apparatus 120 may generate electric power from the periodic acoustic signal.

As depicted in FIG. 4B, client device 110 may be configured to generate a non-periodic analog signal. By way of example, but not limitation, the non-periodic analog signal may include multiple numbers of waveforms, each of which is set to have a different duration time (e.g., t1, t3, t4, t5). Client device 110 may convert a digital signal such as a digital card read request into the non-periodic analog signal based on the each different duration time of the each of waveforms according to a predetermined algorithm. Client device 110 may transmit the non-periodic analog signal of FIG. 4B to card payment apparatus 120 and card payment apparatus 120 may convert the non-periodic analog signal into the digital card read request. Optionally, card payment apparatus 120 may also generate electric power from the non-periodic analog signal.

Thus, FIG. 4A shows an illustrative example of a signal generated and transmitted by client device 110 by which at least portions of a card payment system may be implemented and FIG. 4B shows another illustrative example of a signal generated and transmitted by client device 110 by which at least portions of a card payment system may be implemented.

Figure 5:
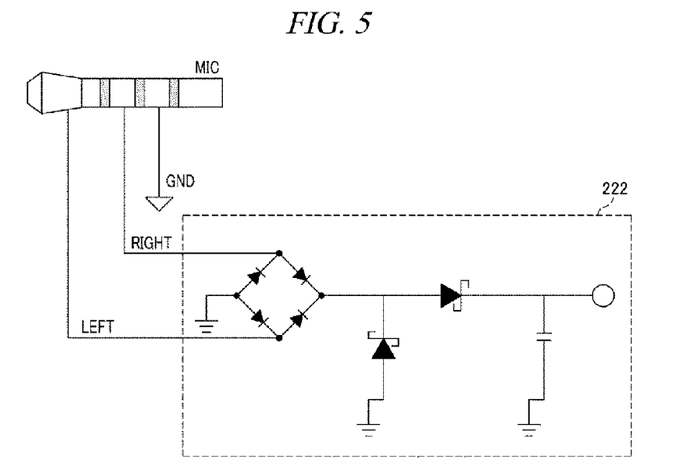
FIG. 5 shows an illustrative example of a circuit to generate electric power in an apparatus by which at least portions of a card payment system may be implemented.

FIG. 5 shows an illustrative example of a circuit to generate electric power in a card payment apparatus 120 by which at least portions of a card payment system may be implemented. In some embodiments, power generator 220 may include a circuit 222 that transforms an alternating current (AC) voltage of an acoustic signal, which is transmitted from client device 110, to a direct current (DC) voltage and boosts the direct current voltage. By way of example, but not limitation, circuit 222 may include at least one of a bridge circuit, a Schottky diode, a capacitor, or a combination thereof. The acoustic signal may be inputted to circuit 222 via at least one earphone contact (e.g., at least one left earphone contact or right earphone contact). Then, magnitudes of the voltage of the acoustic signal may be increased so that the increased voltage may be used as electric power to operate card payment apparatus 120.

Figure 6:
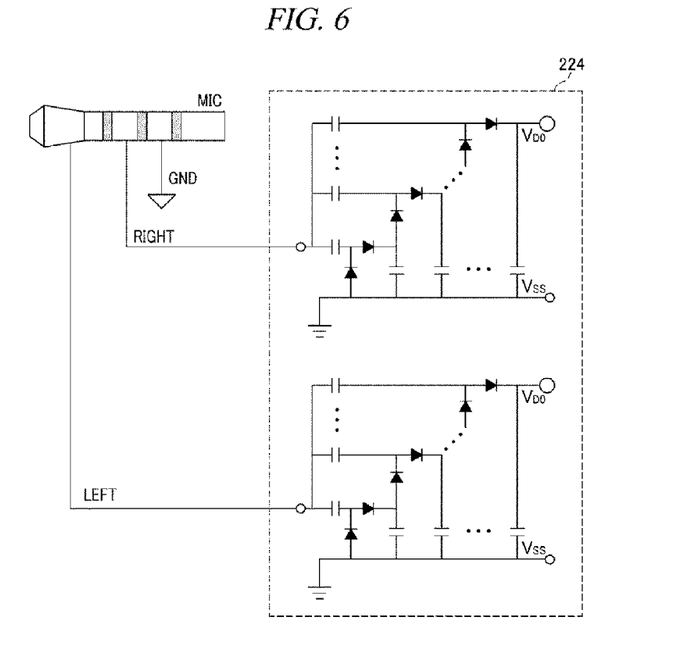
FIG. 6 shows another illustrative example of a circuit to generate electric power in an apparatus by which at least portions of a card payment system may be implemented.

FIG. 6 shows another illustrative example of a circuit to generate electric power in a card payment apparatus 120 by which at least portions of a card payment system may be implemented. In some embodiments, power generator 220 may include a circuit 224 that transforms an alternating current (AC) voltage of an acoustic signal, which is transmitted from client device 110, to a direct current (DC) voltage and boosts the direct current voltage. By way of example, but not limitation, circuit 224 may include two sub-circuits, each of which includes a multiplier circuit that includes multiple capacitors and diodes. One of the two sub-circuits may receive an acoustic signal via one earphone contact (e.g., right earphone contact) and the other of the two sub-circuits may receive an acoustic signal via the other earphone contact (e.g., left earphone contact). Then, each of the two sub-circuits may increase magnitudes of the voltage of the acoustic signals so that the increased voltage may be used as electric power to operate card payment apparatus 120.

Thus, FIG. 5 shows an illustrative example of a circuit to generate electric power in card payment apparatus 120 by which at least portions of a card payment system may be implemented and FIG. 6 shows another illustrative example of a circuit to generate electric power in card payment apparatus 120 by which at least portions of a card payment system may be implemented.

Figure 7A:
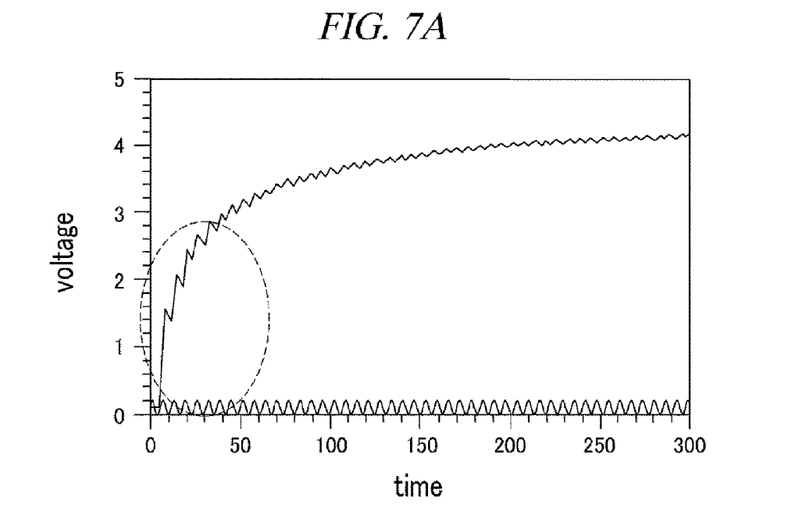
FIG. 7A shows an illustrative example of a graph of outputs from example circuits utilized to generate electric power in an apparatus by which at least portions of a card payment system may be implemented.
Figure 7B:
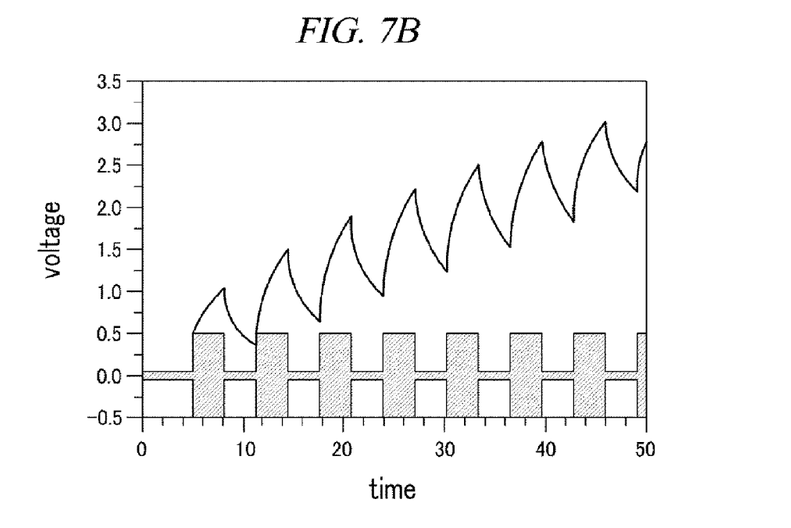
FIG. 7B shows an illustrative example of an enlarged graph of a part of the graph of FIG. 7A.

FIG. 7A shows an illustrative example of a graph of outputs from example circuits utilized to generate electric power in an apparatus by which at least portions of a card payment system may be implemented, and FIG. 7B shows an illustrative example of an enlarged graph of a part of the graph of FIG. 7A. In FIGS. 7A and 7B, an x-axis may refer to a time and a y-axis may refer to a magnitude of a voltage. In some embodiments, if an acoustic signal is inputted to circuit 222 or 224 of power generator 220, circuit 222 or 224 may be configured to transform an alternating current (AC) voltage of an acoustic signal to a direct current (DC) voltage and to increase magnitudes of the DC voltage while repeating boosting and reducing the magnitudes of the DC voltage.

Figure 8A:
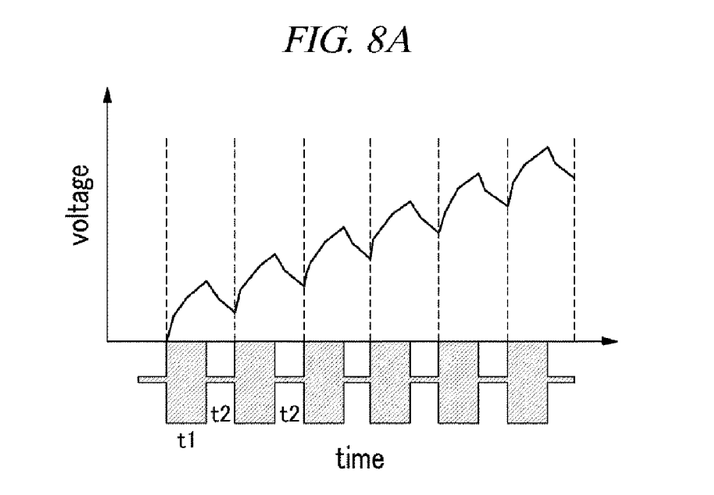
FIG. 8A shows another illustrative example of a graph of outputs from example circuits utilized to generate electric power in an apparatus by which at least portions of a card payment system may be implemented.
Figure 8B:
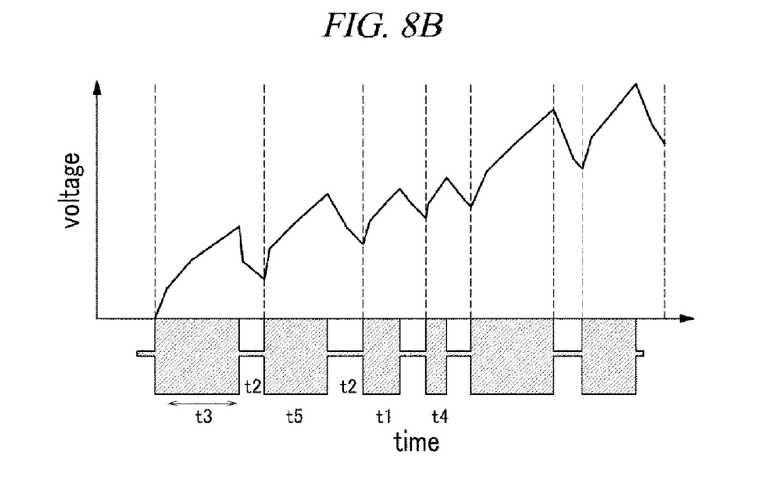
FIG. 8B shows still another illustrative example of a graph of outputs from example circuits utilized to generate electric power in an apparatus by which at least portions of a card payment system may be implemented.

FIG. 8A shows another illustrative example of a graph of outputs from example circuits utilized to generate electric power in an apparatus by which at least portions of a card payment system may be implemented, and FIG. 8B shows still another illustrative example of a graph of outputs from example circuits utilized to generate electric power in an apparatus by which at least portions of a card payment system may be implemented. In FIGS. 8A and 8B, an x-axis may refer to a time and a y-axis may refer to a magnitude of a voltage. FIG. 8A shows a graph of outputs from circuit 222 or 224 when circuit 222 or 224 receives a periodic analog signal from client device 110. Further, FIG. 8B shows a graph of outputs from circuit 222 or 224 when circuit 222 or 224 receives a non-periodic analog signal from client device 110. As depicted in FIGS. 8A and 8B, regardless of types of the analog signal, circuit 222 or 224 may be configured to transform an alternating current (AC) voltage of the periodic analog signal or the non-periodic analog signal to a direct current (DC) voltage and to increase magnitudes of the DC voltage while repeating boosting and reducing the magnitudes of the DC voltage.

As depicted in FIGS. 8A and 8B, the analog signal (i.e., acoustic signal), which is received by circuit 222 or 224, is a pulse signal that has at least one charging duration (e.g., t1, t3, t4, or t5) and at least one discharging duration (e.g., t2). Further, an absolute value of a voltage increase of the DC voltage in the at least one charging duration is greater than an absolute value of a voltage decrease of the DC voltage in the at least one discharging duration. By way of example, in case that circuit 222 or 224 receives a periodic signal as depicted in FIG. 8A, an absolute value of a voltage increase of the DC voltage in charging duration t1 is greater than an absolute value of a voltage decrease of the DC voltage in discharging duration t2. Further, in case that circuit 222 or 224 receives a non-periodic signal as depicted in FIG. 8B, an absolute value of a voltage increase of the DC voltage in charging duration t1, t3, t4 or t5 is greater than an absolute value of a voltage decrease of the DC voltage in discharging duration t2.

Thus, FIG. 7A shows an illustrative example of a graph of outputs from example circuits utilized to generate electric power in an apparatus by which at least portions of a card payment system may be implemented, FIG. 7B shows an illustrative example of an enlarged graph of a part of the graph of FIG. 7A, FIG. 8A shows another illustrative example of a graph of outputs from example circuits utilized to generate electric power in an apparatus by which at least portions of a card payment system may be implemented, and FIG. 8B shows still another illustrative example of a graph of outputs from example circuits utilized to generate electric power in an apparatus by which at least portions of a card payment system may be implemented.

Figure 9:
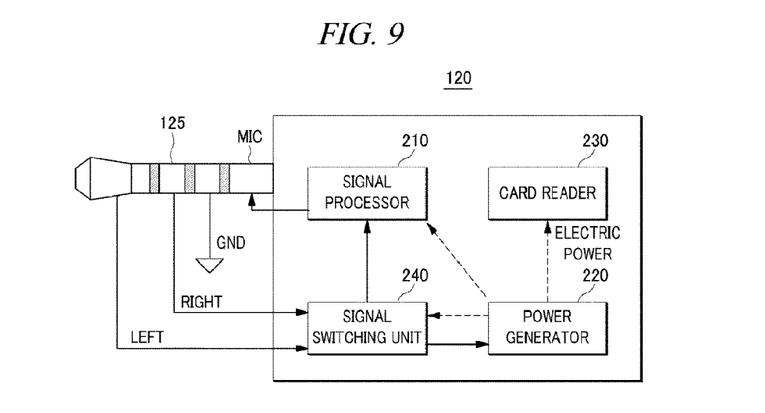
FIG. 9 shows yet another example configuration of a card payment apparatus by which at least portions of a card payment system may be implemented.

FIG. 9 shows yet another example configuration of card payment apparatus 120 by which at least portions of a card payment system may be implemented. As depicted in FIG. 9, card payment apparatus 120, which is described above with regard to FIG. 1, may include audio jack 125, a signal processor 210, a power generator 220, a card reader 230, and a signal switching unit 240. Although illustrated as discrete components, various components may be divided into additional components, combined into fewer components, or eliminated altogether while being contemplated within the scope of the disclosed subject matter. Each function and/or operation of the components may be implemented, individually and/or collectively, by a wide range of hardware, software, firmware, or any combination thereof. In that regard, one or more of signal processor 210, power generator 220, card reader 230, and signal switching unit 240 may be included in an instance of an application hosted by card payment apparatus 120.

Audio jack 125 may include at least one earphone contact, a ground contact and a microphone contact. By way of example, but not limitation, as depicted in FIG. 9, audio jack 125 may include two earphone contacts, one of which is connected to a left side earphone (i.e., left earphone contact) and the other one is connected to a right side earphone (i.e., right earphone contact).

Signal processor 210 may be configured to convert a first digital signal that includes account information which is read by card reader 230 into a first analog signal by using any well-known digital-analog converting scheme. Then, signal processor 210 may be configured to transmit the first analog signal to client device 110 via the microphone contact of audio jack 125.

Further, signal processor 210 may be configured to receive, from signal switching unit 240, a second analog signal to which a second digital signal that includes a card read request is converted. Further, signal processor 210 may be configured to convert the second analog signal into the second digital signal by using any well-known analog-digital converting scheme.

Power generator 220 may be configured to receive, from signal switching unit 240, an acoustic signal. Power generator 220 may be further configured to convert electrical components of the received acoustic signal into electric power to operate card payment apparatus 120. Then, power generator 220 may be configured to provide at least one of signal processor 210, card reader 230 or signal switching unit 240 with the electric power.

Card reader 230 may be configured to read the first digital signal that includes the account information of card 130. By way of example, but not limitation, the account information may include at least one of an account number, a card expiration date, etc. In some embodiments, card reader 230 may read the account information from a magnetic strip of card 130 or an integrated circuit chip of card 130. Card reader 230 may be further configured to transmit the read account information to signal processor 210.

Signal switching unit 240 may be configured to receive the acoustic signal from client device 110. In some embodiments, client device 110 may transmit, to signal switching unit 240, the acoustic signal that includes the second analog signal via at least one earphone contact of audio jack 125. Signal switching unit 240 may be configured to determine that the second analog signal is transmitted from client device 110. Signal switching unit 240 may be further configured to extract the second analog signal from the received acoustic signal and to transmit the second analog signal to signal processor 210. By way of example, but not limitation, the acoustic signal may include a periodic signal portion and a non-periodic signal portion that is associated with the second digital signal. Signal switching unit 240 may extract the non-periodic signal portion of the acoustic signal and then, transmit the non-periodic signal portion of the acoustic signal to signal processor 210 and transmit the periodic signal portion of the acoustic signal to power generator 220.

In some embodiments, client device 110 may transmit, to signal switching unit 240, the second analog signal separately with an acoustic signal that is used to generate electric power. By way of example, but not limitation, signal switching unit 240 may receive the second analog signal via the left earphone contact and receive the acoustic signal that is used to generate electric power via the right earphone contact. Then, signal switching unit 240 may be configured to transmit the second analog signal to signal processor 210 and to transmit the acoustic signal to power generator 220.

Thus, FIG. 9 shows another example configuration of card payment apparatus 120 by which at least portions of a card payment system may be implemented.

Figure 10:
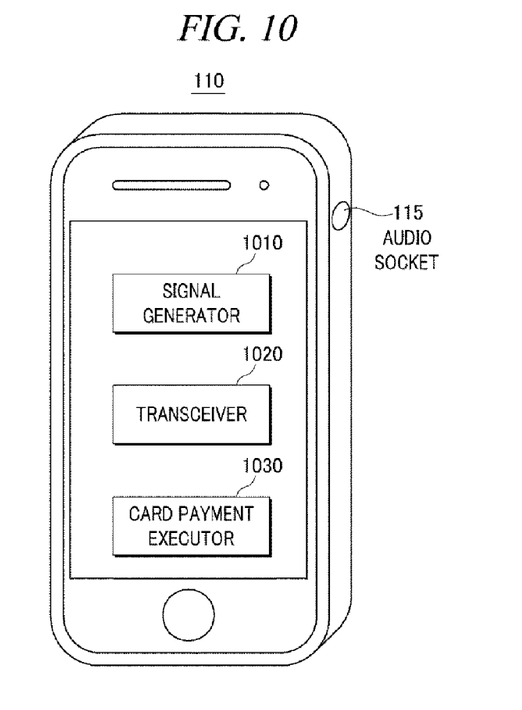
FIG. 10 shows an example configuration of a client device by which at least portions of a card payment system may be implemented.

FIG. 10 shows an example configuration of client device 110 by which at least portions of a card payment system may be implemented. As depicted in FIG. 10, client device 110, which is described above with regard to FIG. 1, may include audio jack socket 115, a signal generator 1010, a transceiver 1020, and a card payment executor 1030. Although illustrated as discrete components, various components may be divided into additional components, combined into fewer components, or eliminated altogether while being contemplated within the scope of the disclosed subject matter. Each function and/or operation of the components may be implemented, individually and/or collectively, by a wide range of hardware, software, firmware, or any combination thereof. In that regard, one or more of signal generator 1010, transceiver 1020, and card payment executor 1030 may be included in an instance of an application hosted by client device 110.

Audio jack socket 115 may be configured or shaped to receive audio jack 125 of card payment apparatus 120. By way of example, as depicted in FIG. 10, audio jack socket 115 may be installed on a surface of client device 110.

In some embodiments, signal generator 1010 may be configured to generate an acoustic signal. By way of example, but not limitation, the acoustic signal may be a periodic signal that has a frequency and a regular magnitude. Alternatively, the acoustic signal may be a non-periodic analog signal that includes multiple numbers of waveforms, each of which is set to have a different duration time.

In some other embodiments, signal generator 1010 may be configured to generate a second digital signal that includes a request for card payment apparatus 120 to read account information from card 130. Signal generator 1010 may be further configured to convert the second digital signal into a second analog signal by using any well-known digital-analog converting scheme.

In some other embodiments, signal generator 1010 may be configured to generate an acoustic signal that includes the second analog signal. By way of example, but not limitation, the acoustic signal may include a periodic signal portion and a non-periodic signal portion that is associated with the second digital signal. Signal generator 1010 may be configured to convert the second digital signal into the second analog signal (e.g., the non-periodic signal portion) based on at least one of the multiple numbers of waveforms and duration times.

Further, signal generator 1010 may be configured to encrypt the acoustic signal and second digital signal by using any well-known encrypting scheme such as a Rivest Shamir Adleman scheme.

Transceiver 1020 may be configured to receive a first analog signal from card payment apparatus 120 via a microphone contact of audio jack 125. The first analog signal is a signal to which a first digital signal that includes account information is converted by card payment apparatus 120. Transceiver 1020 may be further configured to transmit the acoustic signal and second analog signal to card payment apparatus 120 via at least one earphone contact of audio jack 125.

Card payment executor 1030 may be configured to convert the first analog signal into the first digital signal that includes the account information by using any well-known analog-digital converting scheme. If the first digital signal is encrypted, card payment executor 1030 may be further configured to decrypt the encrypted first digital signal. Then, card payment executor 1030 may be further configured to execute a card payment based on the account information between a card payment server which is communicatively coupled to client device 110.

Thus, FIG. 10 shows an example configuration of client device 110 by which at least portions of a card payment system may be implemented.

Figure 11:
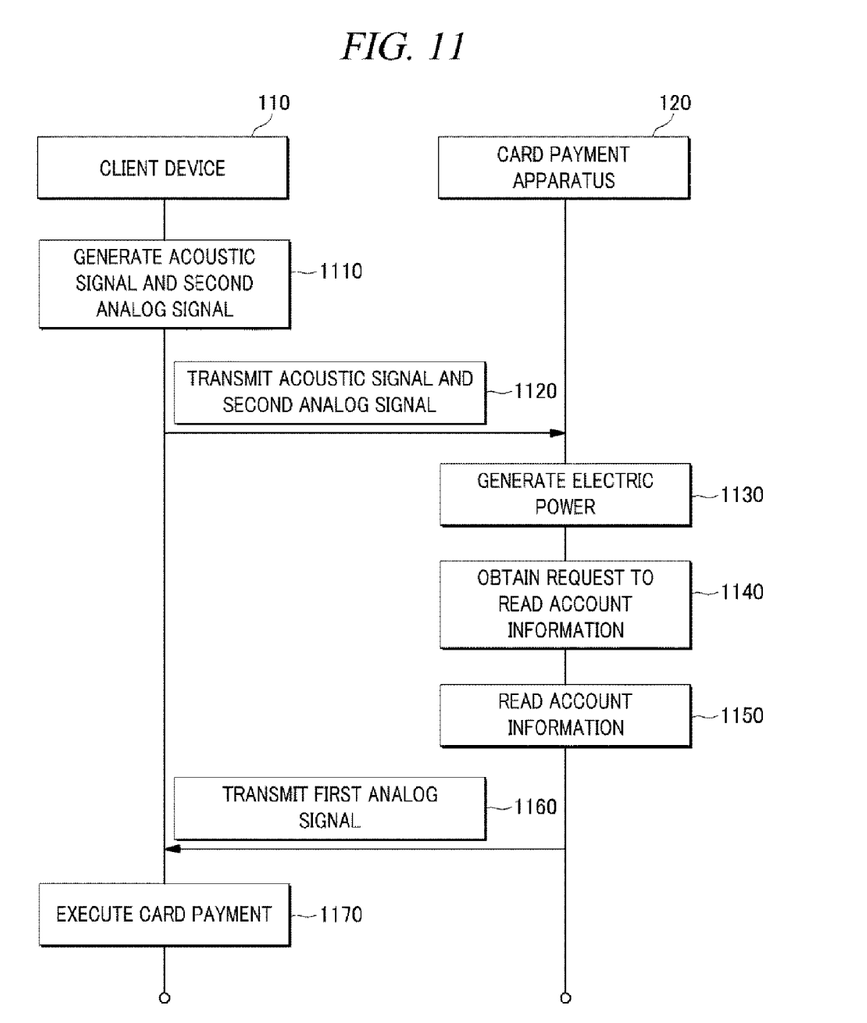
FIG. 11 shows an example processing flow of operations for implementing at least portions of a card payment system.

FIG. 11 shows an example processing flow of operations for implementing at least portions of a card payment system. The operations in FIG. 11 may be implemented in system configuration 100 including client device 110 and card payment apparatus 120, as described with reference to FIG. 1. An example process may include one or more operations, actions, or functions as illustrated by one or more blocks 1110, 1120, 1130, 1140, 1150, 1160 and/or 1170. Although illustrated as discrete blocks, various blocks may be divided into additional blocks, combined into fewer blocks, or eliminated, depending on the desired implementation. Processing may begin at block 1110.

Block 1110 (Generate Acoustic Signal and Second Analog Signal) may refer to client device 110 generating an acoustic signal and a second analog signal. By way of example, but not limitation, the acoustic signal may be a periodic signal that has a frequency and a regular magnitude. Alternatively, the acoustic signal may be a non-periodic analog signal that includes multiple numbers of waveforms, each of which is set to have a different duration time. Further, at block 1110, client device 110 may generate a second digital signal that includes a request for card payment apparatus 120 to read account information from card 130 and convert the second digital signal into a second analog signal. Processing may proceed from block 1110 to block 1120.

Block 1120 (Transmit Acoustic Signal and Second Analog Signal) may refer to client device 110 transmitting the acoustic signal and second analog signal to card payment apparatus 120. In some embodiments, client device 110 may transmit the acoustic signal that includes the second analog signal to card payment apparatus 120 via at least one earphone contact of audio jack 125 of card payment apparatus 120. In some other embodiments, client device 110 may transmit the acoustic signal to card payment apparatus 120, via one of the two earphone contacts of audio jack 125, and transmit the second analog signal separately with the acoustic signal to card payment apparatus 120 via the other one of the two earphone contacts of audio jack 125. Processing may proceed from block 1120 to block 1130.

Block 1130 (Generate Electric Power) may refer to card payment apparatus 120 generating electric power to operate card payment apparatus 120. At block 1130, card payment apparatus 120 may receive, from client device 110, the acoustic signal via at least one earphone contact of audio jack 125. Card payment apparatus 120 may convert electrical components of the received acoustic signal into electric power to operate card payment apparatus 120. Processing may proceed from block 1130 to block 1140.

Block 1140 (Obtain Request to Read Account Information) may refer to card payment apparatus 120 obtaining a request to read account information. In some embodiments, card payment apparatus 120 may convert the second analog signal to the second digital signal by using any well-known analog-digital converting scheme so that card payment apparatus 120 may obtain the request to read the account information from card 130. Processing may proceed from block 1140 to block 1150.

Block 1150 (Read Account Information) may refer to card payment apparatus 120 reading the account information from card 130. By way of example, but not limitation, card payment apparatus 120 may read the account information from a magnetic strip of card 130 or an integrated circuit chip of card 130. At block 1150, card payment apparatus 120 may convert a first digital signal that includes the account information into a first analog signal by using any well-known digital-analog converting scheme. Processing may proceed from block 1150 to block 1160.

Block 1160 (Transmit First Analog Signal) may refer to card payment apparatus 120 transmitting the first analog signal to client device 110. Card payment apparatus 120 may transmit the first analog signal to client device 110 via a microphone contact of audio jack 125 of card payment apparatus 120. Processing may proceed from block 1160 to block 1170.

Block 1170 (Execute Card Payment) may refer to client device 110 executing card payment. Client device 110 may convert the first analog signal into the first digital signal that includes the account information by using any well-known analog-digital converting scheme. Then, client device 110 may execute a card payment based on the account information between a card payment server which is communicatively coupled to client device 110.

Thus, FIG. 11 shows an example processing flow of operations for implementing at least portions of a card payment system.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 12:
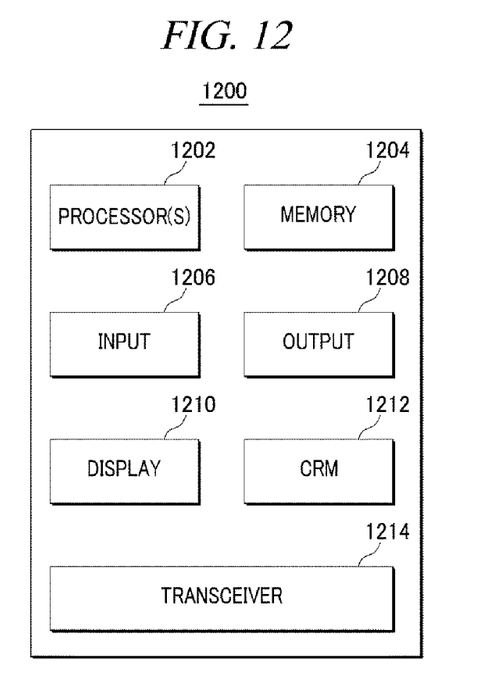
FIG. 12 shows an illustrative computing embodiment, in which any of the processes and sub-processes of a card payment system may be implemented as computer-readable instructions stored on a computer-readable medium.

FIG. 12 shows an illustrative computing embodiment, in which any of the processes and sub-processes of a card payment system may be implemented as computer-readable instructions stored on a computer-readable medium. The computer-readable instructions may, for example, be executed by a processor of a device, as referenced herein, having a network element and/or any other device corresponding thereto, particularly as applicable to the applications and/or programs described above corresponding to the configuration 100 for transactional permissions.

In a very basic configuration, a computing device 1200 may typically include, at least, one or more processors 1202, a system memory 1204, one or more input components 1206, one or more output components 1208, a display component 1210, a computer-readable medium 1212, and a transceiver 1214.

Processor 1202 may refer to, e.g., a microprocessor, a microcontroller, a digital signal processor, or any combination thereof.

Memory 1204 may refer to, e.g., a volatile memory, non-volatile memory, or any combination thereof. Memory 1204 may store, therein, an operating system, an application, and/or program data. That is, memory 1204 may store executable instructions to implement any of the functions or operations described above and, therefore, memory 1204 may be regarded as a computer-readable medium.

Input component 1206 may refer to a built-in or communicatively coupled keyboard, touch screen, or telecommunication device. Alternatively, input component 1206 may include a microphone that is configured, in cooperation with a voice-recognition program that may be stored in memory 1204, to receive voice commands from a user of computing device 1200. Further, input component 1206, if not built-in to computing device 1200, may be communicatively coupled thereto via short-range communication protocols including, but not limitation, radio frequency or Bluetooth.

Output component 1208 may refer to a component or module, built-in or removable from computing device 1200, that is configured to output commands and data to an external device.

Display component 1210 may refer to, e.g., a solid state display that may have touch input capabilities. That is, display component 1210 may include capabilities that may be shared with or replace those of input component 1206.

Computer-readable medium 1212 may refer to a separable machine readable medium that is configured to store one or more programs that embody any of the functions or operations described above. That is, computer-readable medium 1212, which may be received into or otherwise connected to a drive component of computing device 1200, may store executable instructions to implement any of the functions or operations described above. These instructions may be complimentary or otherwise independent of those stored by memory 1204.

Transceiver 1214 may refer to a network communication link for computing device 1200, configured as a wired network or direct-wired connection. Alternatively, transceiver 1214 may be configured as a wireless connection, e.g., radio frequency (RF), infrared, Bluetooth, and other wireless protocols.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A card payment system, comprising:
   a card payment apparatus, having an audio jack, configured to:
   read account information stored on a payment card,
   transmit the account information via a microphone contact of the audio jack,
   receive an acoustic signal generated from a client device via at least one earphone contact of the audio jack, wherein the acoustic signal includes a periodic acoustic signal and a non-periodic acoustic signal,
   convert electrical components of the received acoustic signal into electric power to operate the card payment apparatus,
   extract a second analog signal that is the non-periodic acoustic signal from the acoustic signal, and
   convert the second analog signal into a request to read the account information; and
   the client device, having an audio jack socket to receive the audio jack, configured to:
   receive, from the card payment apparatus, the account information via a receptor for the microphone contact of the audio jack, and
   generate the acoustic signal and transmit, to the card payment apparatus, the generated acoustic signal via the at least one earphone contact.

2. The card payment system of claim 1, wherein the card payment apparatus is further configured to transform an alternating current (AC) voltage of the acoustic signal to a direct current (DC) voltage,
   wherein the acoustic signal is a pulse signal having at least one charging duration and at least one discharging duration, and
   wherein an absolute value of a voltage increase of the DC voltage in the at least one charging duration is greater than an absolute value of a voltage decrease of the DC voltage in the at least one discharging duration.

3. The card payment system of claim 1, wherein the card payment apparatus is configured to transmit the account information by:
   converting the account information into a first analog signal; and
   transmitting the first analog signal, via the microphone contact, to the client device, and
   wherein the client device is configured to receive the account information by:
   receiving the first analog signal, via the receptor for the microphone contact from the card payment apparatus, and
   converting the first analog signal into the account information, and
   wherein the account information is a digital signal.

4. The card payment system of claim 3,
   wherein the client device is further configured to convert the digital signal request to read the account information into the second analog signal.

5. The card payment system of claim 3, wherein the client device is further configured to execute a card payment based on the account information through a card payment server.

6. The card payment system of claim 4,
wherein the second analog signal includes a plurality of waveforms, each of which is set to have a different duration time, and
wherein the client device is further configured to convert the request to read the account information into the second analog signal based on at least one of the plurality of waveforms and the duration time.

7. An apparatus, comprising:
an audio jack having at least one earphone contact and a microphone contact;
a card reader configured to read a first digital signal stored on a card;
a signal processor configured to:
convert the first digital signal to a first analog signal,
transmit, to a client device, the first analog signal via the microphone contact,
receive, via the at least one earphone contact, from the client device, an acoustic signal generated from the client device, the acoustic signal including a periodic signal and a non-periodic signal,
extract a second analog signal that includes the non-periodic signal from the acoustic signal, and
convert the second analog signal to a second digital signal,
wherein the first digital signal includes account information and the second digital signal includes a request to read the account information; and
a power generator configured to:
receive, from the client device, the acoustic signal generated from the client device via the at least one earphone contact, and
convert electrical components of the received acoustic signal into electric power to operate the apparatus.

8. The apparatus of claim 7, wherein the power generator is further configured to transform an alternating current (AC) voltage of the acoustic signal to a direct current (DC) voltage,
wherein the acoustic signal is a pulse signal having at least one charging duration and at least one discharging duration, and
wherein an absolute value of a voltage increase of the DC voltage in the at least one charging duration is greater than an absolute value of a voltage decrease of the DC voltage in the at least one discharging duration.

9. The apparatus of claim 7, wherein the second analog signal includes a plurality of waveforms, each of which is set to have a different duration time, and
wherein the signal processor is further configured to convert the second analog signal into the second digital signal based on at least one of the plurality of waveforms and the duration time.

10. The apparatus of claim 7, wherein the audio jack includes two earphone contacts,
wherein the signal processor is configured to receive the second analog signal via one of the earphone contacts, and
wherein the power generator is further configured to receive the acoustic signal via the other of the earphone contacts.

11. The apparatus of claim 7, further comprising:
a signal switching unit configured to:
determine that the second analog signal is transmitted from the client device via the at least one earphone contact, and
transmit the second analog signal to the signal processor, and
wherein the signal processor is further configured to:
receive the second analog signal from the signal switching unit, and
convert the second analog signal into the second digital signal.

12. The apparatus of claim 7, further comprising:
a signal switching unit configured to:
receive, from the client device via the at least one earphone contact, the second analog signal and the acoustic signal,
transmit the second analog signal to the signal processor, and
transmit the acoustic signal to a power generator; and
a power generator configured to:
receive the acoustic signal from the signal switching unit, and
convert electrical components of the received acoustic signal into electric power to operate the apparatus,
wherein the signal processor is further configured to:
receive the second analog signal from the signal switching unit, and
convert the second analog signal into the second digital signal.

13. A client device, comprising:
an audio jack socket configured to receive an audio jack that includes at least one earphone contact and a microphone contact;
a transceiver configured to:
receive, from the microphone contact, a first analog signal to which a first digital signal is converted, and
transmit, to the least one earphone contact, an acoustic signal generated from the client device and a second analog signal to which a second digital signal is converted, wherein electrical components of the acoustic signal converted into electrical power, via a card payment apparatus, to operate the card payment apparatus, wherein the acoustic signal generated from the client device includes a periodic acoustic signal and a non-periodic acoustic signal, and the second analog signal is the non-periodic acoustic signal that is to be converted into a request to read account information via the card payment apparatus; and
a signal generator configured to:
generate the acoustic signal, and
convert the second digital signal to the second analog signal,
wherein the first digital signal includes the account information stored on a payment card and the second digital signal includes the request to read the account information.

14. The client device of claim 13, further comprising:
a card payment executor configured to:
convert the first analog signal to the first digital signal that includes the account information, and
execute a card payment based on the account information through a card payment server.

15. The client device of claim 13, wherein the audio jack includes two earphone contacts,
wherein the transceiver is further configured to transmit the acoustic signal via one of the earphone contacts, and
wherein the transceiver is further configured to transmit the second analog signal via the other of the earphone contacts.

16. The client device of claim 13, wherein the second analog signal includes a plurality of waveforms, each of which is set to have a different duration time, and wherein the signal generator is configured to convert the second digital signal into the second analog signal based on at least one of the plurality of waveforms and the duration time.

* * * * *